(12) United States Patent
Bolshakov (10) Patent No.: US 10,057,336 B2
(45) Date of Patent: Aug. 21, 2018

(54) DYNAMIC LOAD BALANCING BETWEEN CLIENT AND SERVER

(71) Applicant: SAP SE, Walldorf (DE)

(72) Inventor: Alexander Bolshakov, Peduim (IL)

(73) Assignee: SAP SE, Walldorf (DE)

( * ) Notice: Subject to any disclaimer, the term of this patent is extended or adjusted under 35 U.S.C. 154(b) by 366 days.

(21) Appl. No.: 14/944,024

(22) Filed: Nov. 17, 2015

(65) Prior Publication Data

US 2017/0142194 A1    May 18, 2017

(51) Int. Cl.
| | |
|---|---|
| *G06F 15/167* | (2006.01) |
| *H04L 29/08* | (2006.01) |
| *G06F 9/50* | (2006.01) |

(52) U.S. Cl.
CPC ...... *H04L 67/1002* (2013.01); *H04L 67/2842* (2013.01); *G06F 9/50* (2013.01)

(58) Field of Classification Search
None
See application file for complete search history.

(56) References Cited

U.S. PATENT DOCUMENTS

| 6,182,138 B1 * | 1/2001 | Aoki | G06F 9/5083 |
| | | | 709/224 |
| 6,438,595 B1 * | 8/2002 | Blumenau | G06F 9/5083 |
| | | | 709/226 |
| 7,761,596 B2 * | 7/2010 | Bhargava | H04L 45/00 |
| | | | 709/226 |
| 2002/0152309 A1 * | 10/2002 | Gupta | H04L 12/14 |
| | | | 709/225 |
| 2004/0179534 A1 * | 9/2004 | Pettey | H04L 67/24 |
| | | | 370/395.5 |
| 2004/0267920 A1 * | 12/2004 | Hydrie | H04L 29/06 |
| | | | 709/223 |
| 2005/0171927 A1 * | 8/2005 | Chan | G06F 9/50 |
| 2005/0235126 A1 * | 10/2005 | Ko | G06F 9/50 |
| | | | 711/170 |

(Continued)

OTHER PUBLICATIONS

"European Application Serial No. 16002377.6, Office Action dated Feb. 10, 2017", 27 pgs.

(Continued)

*Primary Examiner* — Razu A Miah
(74) *Attorney, Agent, or Firm* — Schwegman Lundberg & Woessner, P.A.

(57) ABSTRACT

In an example embodiment, a load balancing-capable application container at a first network endpoint comprises an analysis component, a communicator component, and a user application, the user application comprising a first portion containing one or more functions executable by either the first network endpoint or a second network endpoint and a second portion containing one or more functions executable by the first network endpoint but not the second network endpoint. The user application is executed, causing invocation of a first function in the first portion. One or more metrics are obtained from the first network endpoint and the second network endpoint. A real-time aggregate score for the first function is calculated based on the one or more metrics. It is then determined whether to execute the first function on the first network endpoint or the second network endpoint based on a comparison of the real-time aggregate score to a threshold.

19 Claims, 6 Drawing Sheets

(56) References Cited

U.S. PATENT DOCUMENTS

| | | | | |
|---|---|---|---|---|
| 2006/0171298 A1* | 8/2006 | Vu | ................. | G06F 9/5088 370/216 |
| 2008/0046400 A1* | 2/2008 | Shi | ................. | G06F 17/30445 |
| 2008/0165683 A1* | 7/2008 | Saha | ................. | H04L 45/00 370/231 |
| 2009/0113024 A1* | 4/2009 | Verma | ................. | H04L 29/06027 709/219 |
| 2010/0036951 A1* | 2/2010 | Kamath | ................. | H04L 43/08 709/225 |
| 2010/0318999 A1* | 12/2010 | Zhao | ................. | G06F 9/5044 718/104 |
| 2011/0119125 A1* | 5/2011 | Javangula | ................. | G06Q 30/02 705/14.43 |
| 2011/0153723 A1* | 6/2011 | Mutnuru | ................. | H04L 29/12066 709/203 |
| 2013/0128738 A1* | 5/2013 | Cohen | ................. | H04L 45/125 370/235 |
| 2013/0208594 A1* | 8/2013 | Thubert | ................. | H04L 47/125 370/235 |
| 2014/0101226 A1* | 4/2014 | Khandekar | ................. | H04L 67/1008 709/203 |
| 2014/0258524 A1* | 9/2014 | Thyni | ................. | H04L 43/0852 709/224 |
| 2015/0092557 A1* | 4/2015 | Deshmukh | ................. | H04L 47/125 370/235 |

OTHER PUBLICATIONS

Costa, Philipp, et al., "MpOS: A Multiplatform Offloading System", (2015), 577-584.

Cuervo, Eduardo, et al., "MAUI: Making Smartphones Last Longer with Code Offload", MobiSys, (2010), 49-62.

Khan, Atta Ur Rehman, et al., "A Survey of Mobile Cloud Computing Applicaiton Models", IEEE Communications Surveys & Tutorials, vol. 16, No. 1, (2014), 393-413.

* cited by examiner

DYNAMIC LOAD BALANCING BETWEEN CLIENT AND SERVER

TECHNICAL FIELD

This document generally relates to systems and methods for computer load balancing. More specifically, this document relates to dynamic load balancing between a client and a server.

BACKGROUND

In traditional server-client relationships, workload is spread between the client and server. "Thin clients" tend to perform very little computational work, leaving the majority of the computational tasks to the server, while "thick clients" tend to perform a great deal of computational work, in comparison to the server. There are, of course, many different implementations across the entire spectrum of thin and thick clients.

No matter the implementation, however, the distribution of which operations or tasks are performed on the client side and which operations or tasks are performed on the server side is determined at the software's design time. A programmer or other program creator makes a decision as to whether or not a particular operation will be performed on the client side or on the server side when creating the server-side and/or client-side applications, which are often written in completely different programming languages.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

In an example embodiment, a client-side application and a server-side application are written in a single programming framework that allows a programmer to write the entire client-server application as a single project, using a single framework. The framework is designed to decide dynamically at runtime where each portion of the code will be executed, based on such factors as client computational capabilities, server load, latency and other network conditions, amount of data to be sent on the network, estimated size of response from client or server, compressibility of data to be sent on the network, amount of data that needs to be stored in memory until a response arrives back, or a hard-coded setting from the developer.

Running an application involves chains of function invocations. This occurs on both the client and server sides. In an example embodiment, a dynamic code execution analyzer running on both the client and server sides analyzes call stacks, accumulates data, an exchanges execution stats between the client and server. This component then decides if the next function invocation should occur on the server side or on the client side. This decision may be based on the collected real-time information as well as accumulated data. If the decision is to invoke the next function on the other side, all the data that is needed for that function invocation is transferred to the other side, such as the data from the stacks and heaps. On the other side, the function invocation chain is completed and the response (a generated function return value) can be transferred back.

For purposes of this disclosure, a client device and a server device will both be referred to as network endpoints. Thus, a client device may be thought of as a first network endpoint, while a server device may be thought of as a second network endpoint, or vice-versa.

Figure 1:
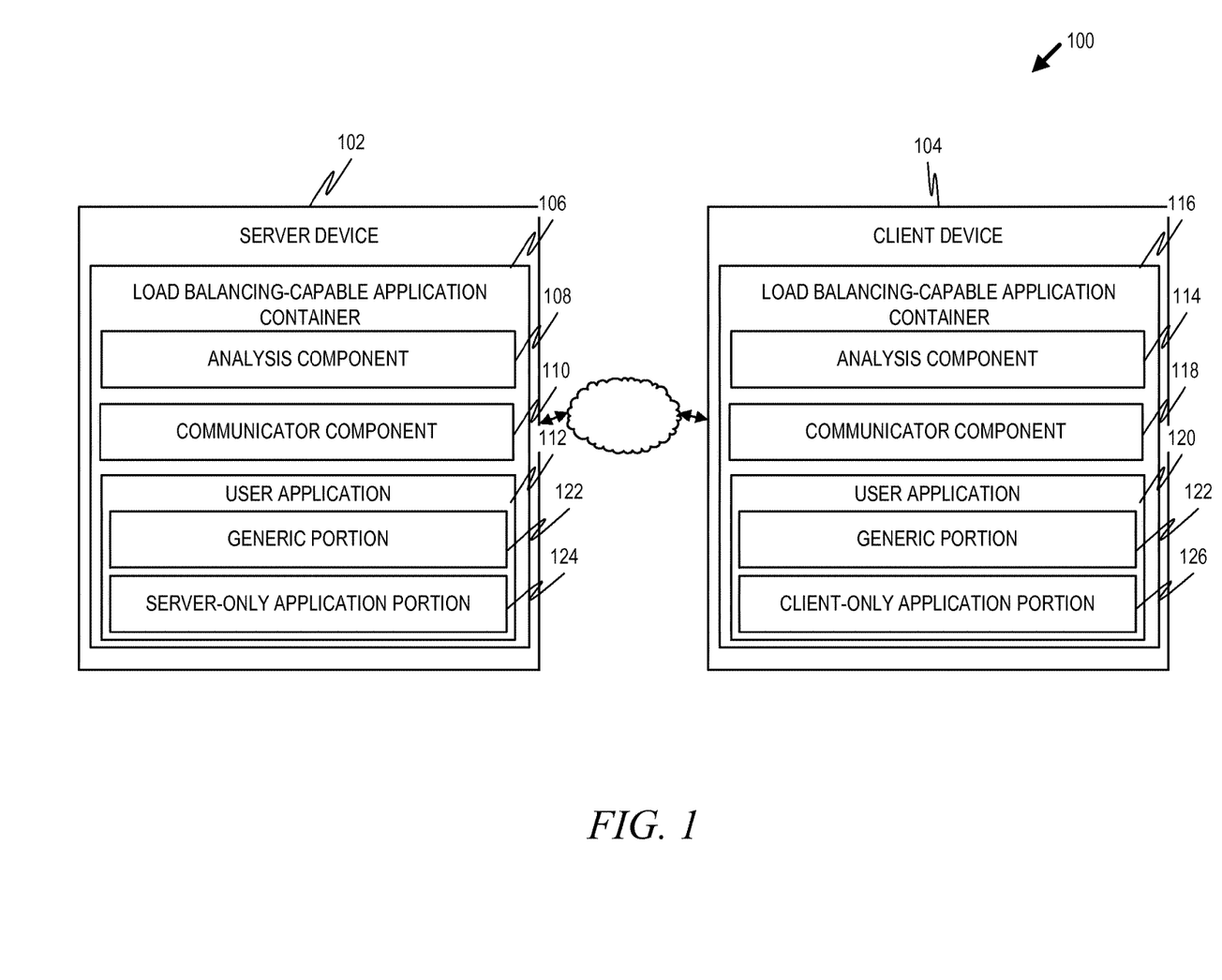
FIG. 1 is a block diagram illustrating a system, in accordance with an example embodiment, for dynamic load balancing.

FIG. 1 is a block diagram illustrating a system 100, in accordance with an example embodiment, for dynamic load balancing. The system 100 includes a server device 102 and a client device 104. Each of the server device 102 and client device 104 may be any type of computing device, including, for example, a hardware server/tower computer, desktop computer, laptop computer, or mobile device such as a smartphone, tablet computer, or wearable device.

The server device 102 also includes a load balancing-capable application container 106. The load balancing-capable application container 106 is a conglomeration of computer code assembled during design-time. It includes an analysis component 108, a communicator component 110, and a user application 112. The analysis component 108, as described in more detail below, acts to analyze, at run-time, one or more factors to determine whether a particular function being invoked should be executed on the client device 104 or server device 102. A similar, if not identical, analysis component 114 may be included in a load balancing-capable application container 116 included on the client device 104. In some example embodiments, the two analysis components 108, 114 work together to perform the analysis, but in other example embodiments, one or the other runs independently to perform the analysis and communicate the decision to the other. Communication between the analysis component 108 on the server device 102 and the analysis component 114 on the client device 104 may be accomplished through the communicator component 110 in the load balancing-capable application container 106 on the server device 102 and a similar, if not identical, communicator component 118 included in the load balancing-capable application container 116 on the client device 104.

Each load balancing-capable application container 106, 116 also contains a user application 112, 120, respectively. Notably, however, the user application 112 is not identical to the user application 120. While both the user application 112 and the user application 120 contain an identical generic portion 122, the user application 112 contains a server-only application portion 124 which is not contained in the user application 120, and the user application 120 contains a client-only application portion 126, which the user application 112 does not.

The generic portion 122 includes code representing functions that can be executed on either the server device 102 or the client device 104. These will typically be decided upon during design-time, although in one example embodiment functions may be added to the generic portion 122 at run-time. As their names indicate, the server-only application portion 124 contains functions that can be executed only by the server device 102 (and not the client device 104), while the client-only application portion 126 contains functions that can be executed only by the client device 104 (and not the server device 102). The decision as to which functions reside in which portion 122, 124, 126 can be based on a number of factors. For example, a function may be placed in the server-only application portion 124 for security reasons, such as if there is a threat that hacking or reverse engineering the code for the function may endanger network, application, or user security, or simply negatively impact business or legal goals (such as keeping trade secret protection on a portion of code or otherwise preventing competitors from gaining a preventative advantage). Likewise, a function may be placed in the client-only application portion 126 for practical computer execution reasons. For example, if the function involves a final stage of graphical rendering, there may be no reason for the function to ever be performed on the server device 102, which does not have the need (or sometimes the ability) to display graphics locally.

The load balancing-capable application containers 106, 116 may, in some example embodiments, be written in an identical programming language that is capable of being executed on either the client device 104 or server device 102. In an example embodiment, the load balancing-capable application container 116 may be executed in a web browser (not pictured) operating on the client device 104, and thus may be compatible with web browser technology. Such an implementation also allows the analysis component 114 to request information from the web browser to use during the analysis of whether a given function should be executed on the client device 104 or server device 102.

The result of using a system 100 as described in an example embodiment is that computing resources can be balanced better between client and server and dynamically reconfigured at run-time to ensure maximum efficiency and/or performance. Companies are also able to spend less money on computing resources, as the efficient management of computing resources allows for reduced reliance on expensive components that were previously only used during periods of peak usage. For example, rather than having servers with the most expensive and fastest processor on the market, which previously was necessary to handle peak usage even though peak usage periods only occurred 0.01% of the time, the company could purchase much cheaper servers that can handle usage fine 99.99% of the time, and rely upon the system 100 described herein to ensure that the client device 104 takes over certain functions during that 0.01% of the time when the server device 102 cannot handle the load.

Likewise, performance on the client side can be maximized. A client device 104 that is busy performing other tasks can offload some functions to the server device 102 and yet resume those functions on the client device 104 when the other tasks are completed. If those functions involve aspects that cause a noticeable increase in performance when performed on the client side due to, for example, network congestion, then use of the client device 104 to perform these functions when possible elicits a noticeable increase in satisfaction on the part of users, who perceive the application as running without delay when the client device 104 is not performing other tasks, and as running with only minimal delay when the client device 104 is performing other tasks. This is in contrast to the perception that would occur if the function were statically run always on the client side (which causes a perception of great delay when the client device 104 is busy with other tasks), or statically run always on the server side (which causes a perception of minimal delay, but all the time, even when the client device 104 is not performing other tasks).

Figure 2:
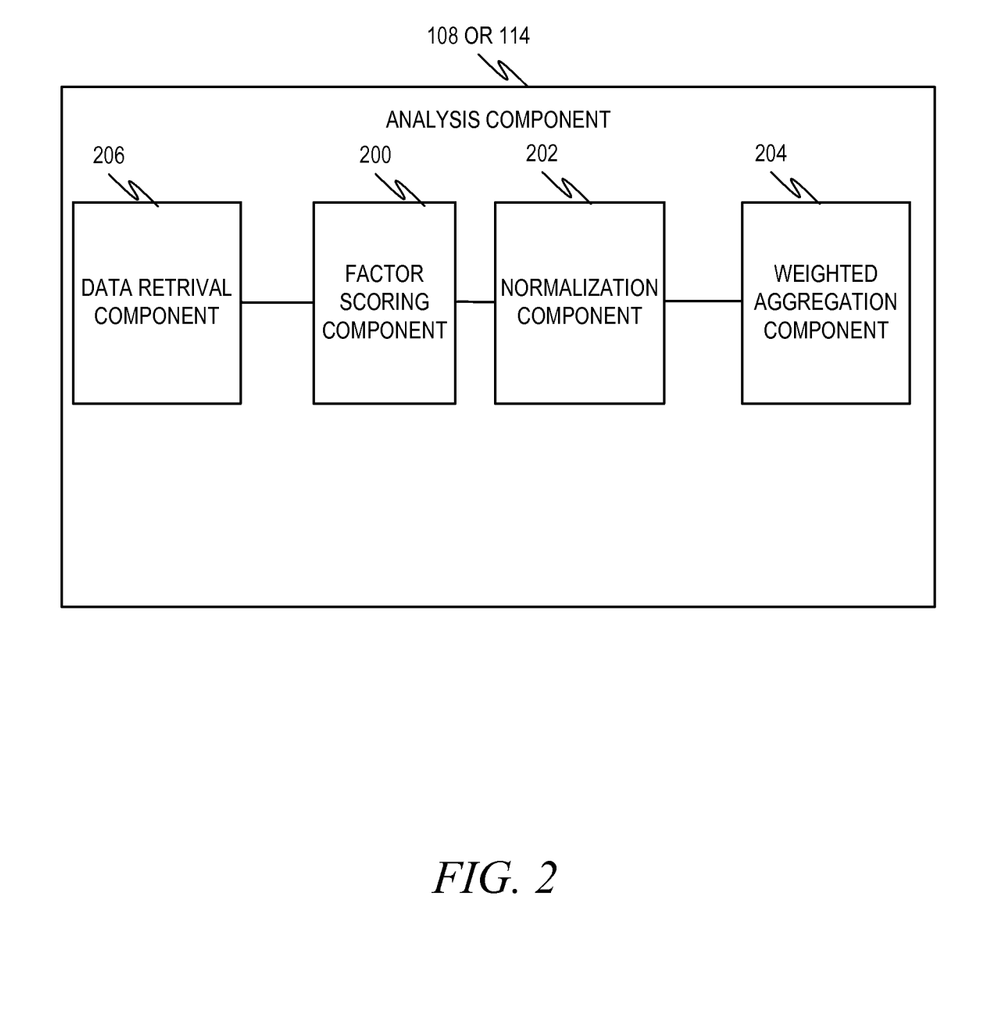
FIG. 2 is a block diagram illustrating an analysis component, in accordance with an example embodiment.

FIG. 2 is a block diagram illustrating an analysis component such as the analysis component 108 or the analysis component 114 of FIG. 1, in accordance with an example embodiment. A factor scoring component 200 analyzes data relevant to a particular factor and outputs a score for the factor. This process will be described in more detail below. A normalization component 202 then normalizes the score for the factor and outputs the normalized score to a weighted aggregation component 204. The weighted aggregation component 204 then assigns a weight to each outputted normalized factor score and aggregates the weighted normalized factor scores into a load balancing score. The load balancing score may then be compared to a threshold, which determines whether the currently invoked function should be executed on the client side or the server side. In an example embodiment, this is all performed at run-time when a particular function is invoked.

Depending on the factor involved, the factor scoring component 200 may need to access different data, possibly from the other side of the network (e.g., if the analysis component 114 is located on the client device 104, it may require data from the server device 102, or if the analysis component 108 is located on the server device 102, it may require data from the client device 104). In order to collect the data, the factor scoring component 200 can access a data retrieval component 206, which acts to collect the appropriate data, either from the server device 102 or the client device 104.

In an example embodiment, one factor evaluated by the factor scoring component 200 is processor load. This factor may utilize data from both the server device 102 and the client device 104. Data about current processor workload may be obtained from both the client device 104 and the server device 102 by the data retrieval component. 206. Thus, the data retrieval component 206 utilizes the communicator components 110, 118 when it needs to obtain the processor load from the device on the other side of the network, but can ask the operating system of its own device directly for such information. A score may be assigned to the client processor load and a separate score assigned to the server processor load. For example, a processor load score may be an inverse of processor utilization, as measured by an operating system of the device.

It should be noted that in some example embodiments, because an analysis component 108, 114 resides on both devices 102, 104, the two analysis components 108, 114 can work in conjunction with each other to perform data retrieval and or calculations relevant to the factor scoring component 200. Thus, for processing load, the analysis component 108 on the server device 102 may calculate server processor load and communicate it to the client device 104, whereas the analysis component 114 on the client device 104 may calculate client processor load and communicate it to the server device 102. The rates at which this data is calculated may also vary between the client device 104 and server device 102. For example, client processing load typically changes less frequently than server processing load, and as such it may only be necessary for the data retrieval component 206 on the client device 104 to obtain processing workload once per session, whereas the data retrieval component 206 on the server device 102 may obtain processing workload each time a function is invoked. While requests for processing workload typically themselves are not all that resource-dependent, minimizing the number of requests for this information may be useful in that it may be important to minimize the amount of data transferred between the client device 104 and the server device 102. In other words, it is often unnecessary for the client device 104 to waste bandwidth by sending frequent updates to the server device 102 about its processing load.

This may be extended not only to communications of the underlying data itself but also to the calculations performed by the factor scoring component 200. For example, rather than a factor scoring component 200 on the client device 104 obtaining information about both the processor load of the client device 104 and the processor load of the server device 102, it may be beneficial for the factor scoring component 200 on the client device 104 to calculate a score for processor load of the client device 104 only, and communicate this score to the factor scoring component 200 on the server device 102.

In another example embodiment, latency or other network conditions may be evaluated as a factor. This may be performed independently on the client device 104 and server device 102 and may involve sending test transfers across the network and measuring response time and other network data. While the network latency may be measured independently on either side, when a score for the network latency is calculated, the average of the measurements on the client device 104 and the measurements on the server device 102 may be performed. A score may be assigned based on the average latency (or other network conditions). For example, latency is often expressed in nanoseconds, with higher values equaling higher latency. A score may be assigned as being equal to the average latency in nanoseconds.

In another example embodiment, amount of data to be sent on the network may be evaluated as a factor. This may be determined by examining a call stack located on the server device 102 and a call stack located on the client device 104 and looking for calls that will cause data to be output over the network. An estimate of the amount of data to be generated by these calls may then be made. As with network latency, the measurements may be performed independently on the server device 102 and client device 104 and averaged. A score may be assigned based on this amount of data to be sent. For example, the total size (in KB) of data to be sent on the network may be used as the score.

In another example embodiment, estimated size of a response from another side may be evaluated as a factor. Unlike the preceding factor, this factor may be based on an accumulated statistic. Specifically, the size of responses sent by either the client device 104 or the server device 102 may be tracked and saved over time. This past historical information may then be used to estimate the size of a response (for the particular function that is currently invoked) from the other side. For example, if the other side is the server device 102, the average response size in the past from the server device 102 may be used as the estimated size of response. A score may be assigned based on this average response size. For example, the average size (in KB) of past responses to the currently invoked function may be used as the score.

In another example embodiment, compressibility of data to be sent on the network may be evaluated as a factor. As with the estimated size of response, this factor may also be evaluated based on an accumulated statistic, here the statistic being the average compressibility of data sent in response to the currently invoked function. Data is typically compressed prior to being sent over a network in order to reduce network bandwidth usage. How much a particular piece of data has been compressed is typically expressed as a percentage of the uncompressed size. Thus, for example, a 10 kB file that is compressed to 4 kB is typically said to have been compressed to 40% of its original size. This may also be used as a metric for compressibility. Thus, if past files compressed in response to a particular function invocation have been compressed on average to 40% of their size, it may be assumed that future files compressed in response to the same function will have the same compressibility. A score may then be assigned based on this estimated compressibility. For example, the percentage value of the average compressibility of data sent in response to invocations of the currently invoked function may be used as the score.

In another example embodiment, an amount of data that needs to be stored in memory until the response arrives back may be evaluated as a factor. This may be determined by examining a call stack located on the server device 102 and a call stack located on the client device 104 and looking for calls that will cause data to be stored in memory while awaiting a response. An estimate of the amount of data to be stored by these calls may then be made. As with network latency, the measurements may be performed independently on the server device 102 and client device 104 and averaged. A score may be assigned based on this amount of data to be stored. For example, the total size (in KB) of data to be stored may be used as the score.

In another example embodiment, an override factor may be used by a developer to override any other factors calculated by the factor scoring component 200. Thus, a developer could, for certain functions, inform the factor scoring component 200 that all other scores should be overridden and the function should be executed by the client device 104 or the server device 102, as the developer desires.

A normalization component 202 then normalizes each of the scores from the factor scoring component 200 so that, for example, they are all on the same scale. Thus, for example, each score may be normalized to a scale of 1-10. It is, of course, not necessary that all scores be normalized to the same scale, and indeed there is much interplay between how much normalization the normalization component 202 needs to apply to each score and how much weight the weighted aggregation component 204 needs to assign to each score. Indeed, in some example embodiments the normalization component 202 may be eliminated completely and the scaling of the individual scores may be performed solely via the use of weights in the weighted aggregation component 204.

As an example, the weighted aggregation component 204 may compute an overall score on a client device 104 as follows:

$$0.7A + -0.7B + 5C + 0.1D + 0.1E + 0.3F + 0.1G,$$

where A is the client processor load score, B is the server processor load score, C is the latency of the network score, D is the amount of data to be sent on the network score, E is the estimated size of the response from the server score, F is the compressibility of data to be sent by the client score, and G is the score assigned based on the amount of data that needs to be stored in memory on the client until a response comes back from the server.

In an example embodiment, different formulas are used by the weighted aggregation component 204 depending upon whether the weighted aggregation component 204 is located on the client device 104 or the server device 102. In another example embodiment, the formulas themselves may dynamically change, perhaps differing on a function-by-function basis.

Figure 3:
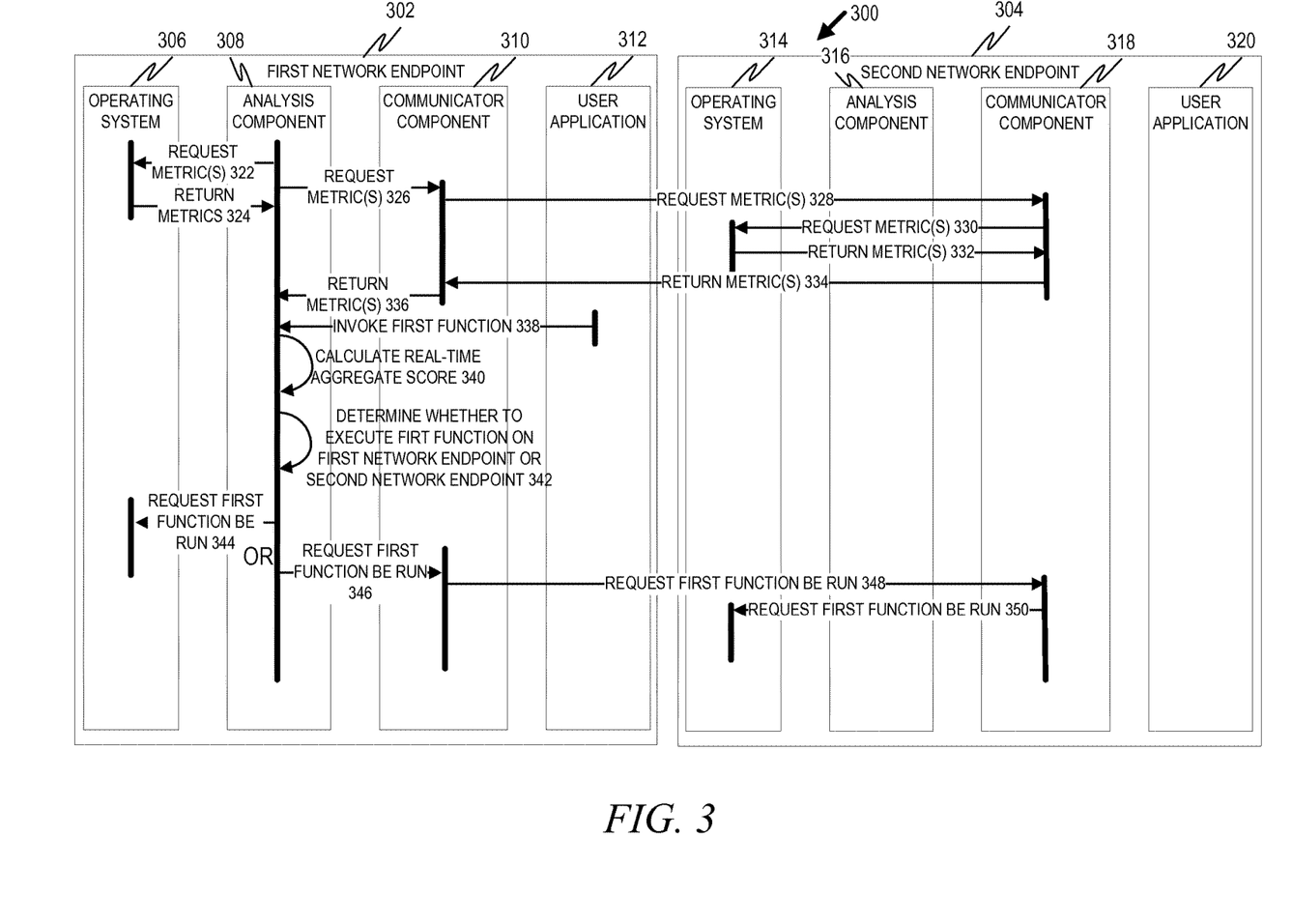
FIG. 3 is an interaction diagram illustrating a method, in accordance with an example embodiment, of load balancing between a first network endpoint and a second network endpoint.

FIG. 3 is an interaction diagram illustrating a method 300, in accordance with an example embodiment, of load balancing between a first network endpoint 302 and a second network endpoint 304. The first network endpoint 302 may include an operating system 306, an analysis component 308, a communicator component 310, and a user application 312. The second network endpoint 304 may also include an operating system 314, an analysis component 316, a communicator component 318, and a user application 320.

At operation 322, the analysis component 308 requests one or more metrics from the operating system 306. At operation 324, these one or more metrics are returned from the operating system 306. At operation 326, one or more metrics are requested from the second network endpoint 304 via the communicator component 310, which relays this request at operation 328 to the communicator component 318 of the second network endpoint 304, which then relays the communication to the operating system 314 of the second network endpoint 304 at operation 330. These metrics are returned via operations 332, 334, and 336.

It should be noted that in an alternative embodiment one or more of these metrics may be obtained from the analysis component 316 of the second network endpoint 304, in lieu of, or in addition to, the operating system 314 of the second network endpoint 304.

At operation 338, the user application 312 on the first network endpoint 302 is executed, causing invocation of a first function. This invocation may be detected by the analysis component 308.

At operation 340, a real-time aggregate score is calculated for the first function based on the one or more metrics from the first network endpoint 302 and the one or more metrics from the second network endpoint 304. This score is real-time in that at least one of the metrics is measured at or after the time the first function is invoked.

At operation 342, it is determined whether to execute the first function on the first network endpoint 302 or the second network endpoint 304 based on a comparison of the real-time aggregate score for the first function to a threshold. This threshold may be a set threshold or may, in some example embodiments, vary based on one or more factors, such as a type of first function invoked. At this point, the first function is caused to be executed on the network endpoint determined in the determining, either by sending a message to the operating system 306 of the first network endpoint 302 at operation 344, or by sending a message to the operating system 314 of the second network endpoint 304 via the communicator component 310 of the first network endpoint 302 and the communicator component 318 of the second network endpoint 304 at operations 346, 348, and 350.

Figure 4:
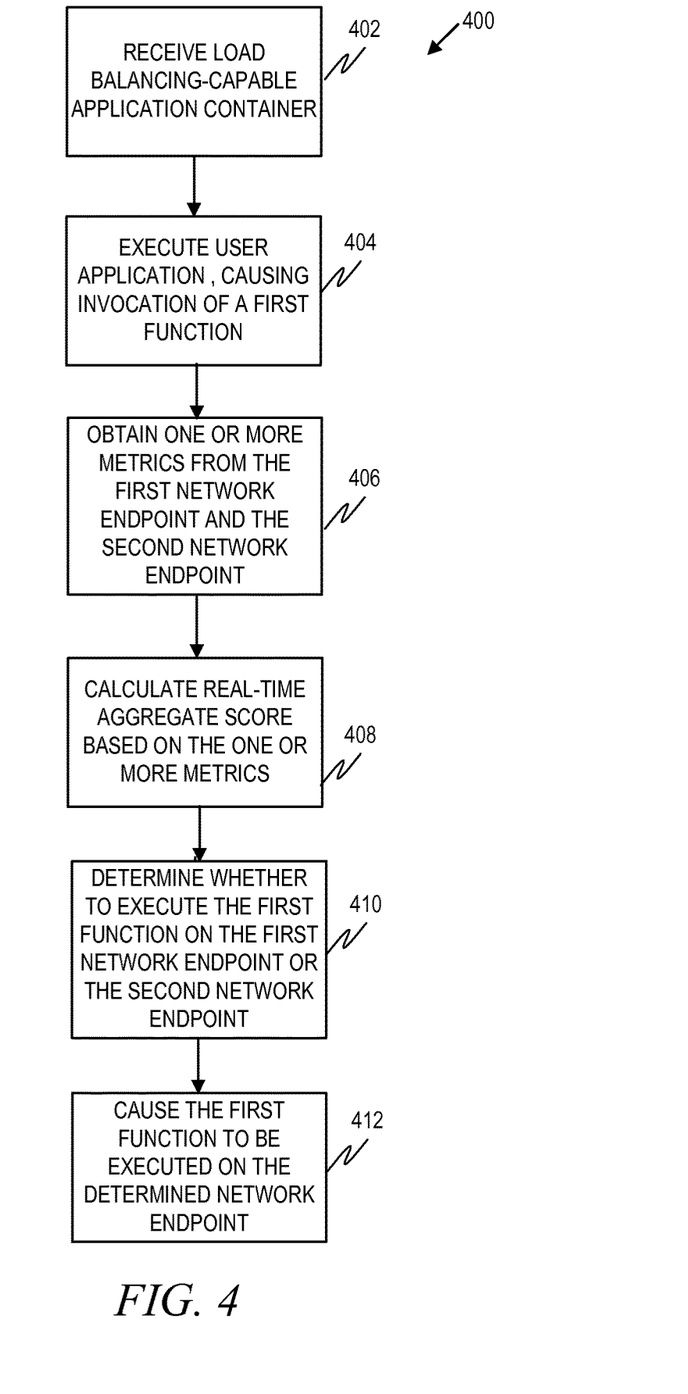
FIG. 4 is a flow diagram illustrating a method, in accordance with an example embodiment, of load balancing between a first network endpoint and a second network endpoint.

FIG. 4 is a flow diagram illustrating a method 400, in accordance with an example embodiment, of load balancing between a first network endpoint and a second network endpoint. This method may be performed entirely on the first network endpoint, although aspects of the method could also be performed on the second network endpoint. At operation 402, a load balancing-capable application container is received at the first network endpoint, the container comprising an analysis component, a communicator component, and a user application, the user application comprising a first portion containing one or more functions executable by either the first network endpoint or the second network endpoint and a second portion containing one or more functions executable by the first network endpoint but not the second network endpoint. A similar container, written in an identical programming language, may be received at the second network endpoint. The two containers may differ only in the presence of the second portion of the user application, which in the case of the second network endpoint may be replaced by a third portion containing one or more functions executable by the second network endpoint but not the first network endpoint.

At operation 404, the user application is executed, causing invocation of a first function in the first portion. This invocation may be detected by the analysis component, which may be run by a processor of the first network endpoint at the same time the user application is run.

At operation 406, in response to the invocation of the first function, one or more metrics are obtained from the first network endpoint and the second network endpoint. These metrics may be obtained directly from the operating system of the first network endpoint, or alternatively can be obtained from the second network endpoint via the communicator component. At operation 408, a real-time aggregate score is calculated for the first function based on the one or more metrics. This score is real-time in that at least one of the metrics is measured at or after the time the first function is invoked.

At operation 410, it is determined whether to execute the first function on the first network endpoint or the second network endpoint based on a comparison of the real-time aggregate score for the first function to a threshold. This threshold may be a set threshold or may, in some example embodiments, vary based on one or more factors, such as a type of first function invoked. At operation 412, the first function is caused to be executed on the network endpoint determined in the determining. This may involve either causing the processor of the first network endpoint to execute the first function, or informing the second network endpoint to have its processor execute the first function.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-4 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 5:
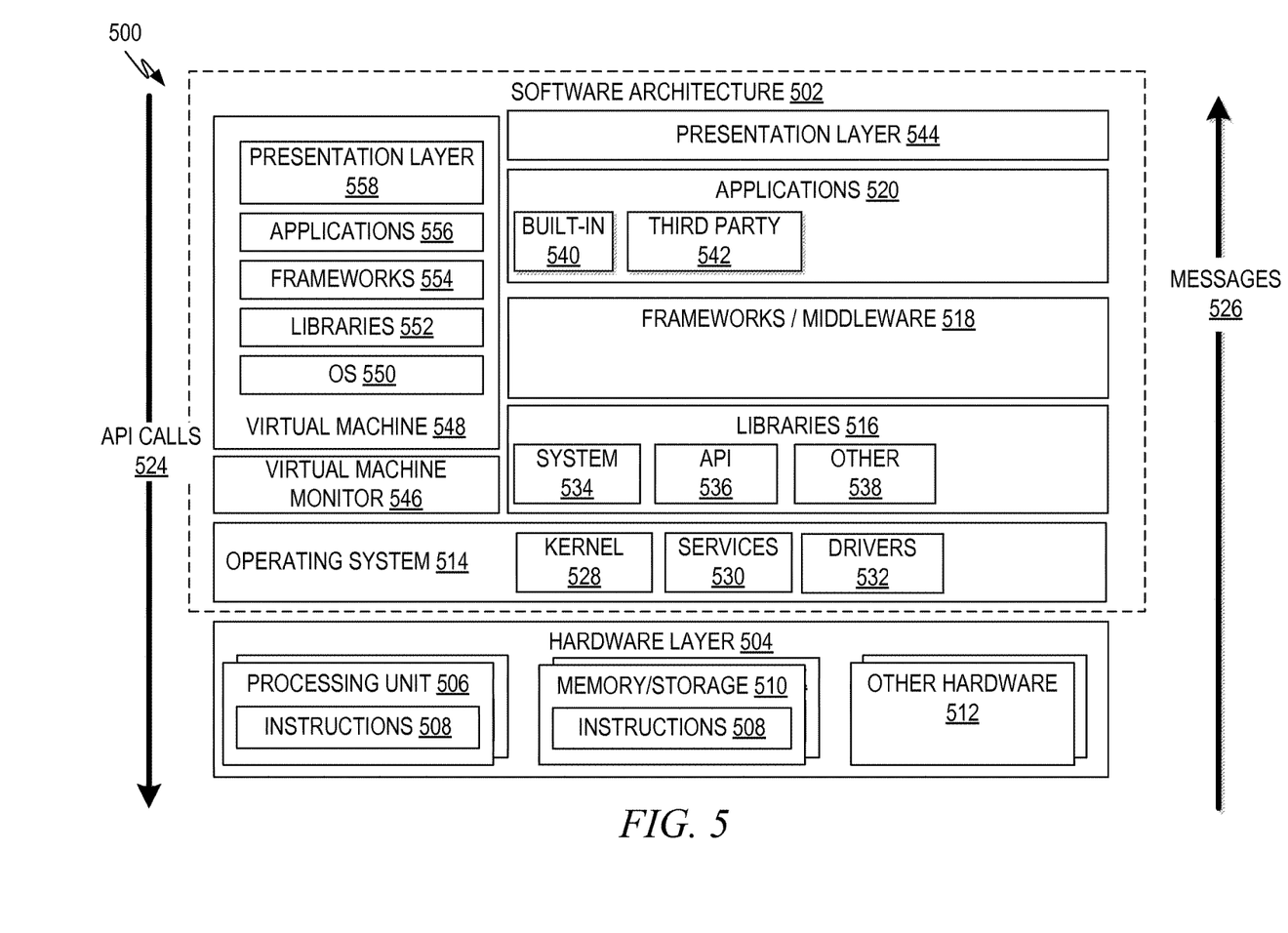
FIG. 5 is a block diagram illustrating a representative software architecture, which may be used in conjunction with various hardware architectures herein described.

FIG. 5 is a block diagram 500 illustrating a representative software architecture 502, which may be used in conjunction with various hardware architectures herein described. FIG. 5 is merely a non-limiting example of a software architecture 502, and it will be appreciated that many other architectures may be implemented to facilitate the functionality described herein. The software architecture 502 may be executing on hardware such as a machine 600 of FIG. 6 that includes, among other things, processors 610, memory/storage 630, and I/O components 650. A representative hardware layer 504 is illustrated and can represent, for example, the machine 600 of FIG. 6. The representative hardware layer 504 comprises one or more processing units 506 having associated executable instructions 508. The executable instructions 508 represent the executable instructions of the software architecture 502, including implementation of the methods, modules, and so forth of FIGS. 1-4. The hardware layer 504 also includes memory and/or storage modules 510, which also have the executable instructions 508. The hardware layer 504 may also comprise other hardware 512, which represents any other hardware of the hardware layer 504, such as the other hardware illustrated as part of the machine 600.

In the example architecture of FIG. 5, the software architecture 502 may be conceptualized as a stack of layers where each layer provides particular functionality. For example, the software architecture 502 may include layers such as an operating system 514, libraries 516, frameworks/middleware 518, applications 520, and a presentation layer 544. Operationally, the applications 520 and/or other components within the layers may invoke application programming interface (API calls 524 through the software stack and receive a response, returned values, and so forth illustrated as messages 526 in response to the API calls 524. The layers illustrated are representative in nature, and not all software architectures have all layers. For example, some mobile or special purpose operating systems may not provide a frameworks/middleware 518, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 516 may provide a common infrastructure that may be utilized by the applications 520 and/or other components and/or layers. The libraries 516 typically provide functionality that allows other software modules to perform tasks in an easier fashion than to interface directly with the underlying operating system 514 functionality (e.g., kernel 528, services 530, and/or drivers 532). The libraries 516 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic context on a display), database libraries (e.g., SQLite that may provide various relational database functions), web libraries (e.g., WebKit that may provide web browsing functionality), and the like. The libraries 516 may also include a wide variety of other libraries 538 to provide many other APIs to the applications 520 and other software components/modules.

The frameworks/middleware 518 may provide a higher-level common infrastructure that may be utilized by the applications 520 and/or other software components/modules. For example, the frameworks/middleware 518 may provide various graphic user interface (GUI) functions, high-level resource management, high-level location services, and so forth. The frameworks/middleware 518 may provide a broad spectrum of other APIs that may be utilized by the applications 520 and/or other software components/modules, some of which may be specific to a particular operating system or platform.

The applications 520 include built-in applications 540 and/or third-party applications 542. Examples of representative built-in applications 540 may include, but are not limited to, a contacts application, a browser application, a book reader application, a location application, a media application, a messaging application, and/or a game application. Third-party applications 542 may include any of the built-in applications 540 as well as a broad assortment of other applications. In a specific example, the third-party application 542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 542 may invoke the API calls 524 provided by the mobile operating system such as operating system 514 to facilitate functionality described herein.

The applications 520 may utilize built-in operating system functions (e.g., kernel 528, services 530, and/or drivers 532), libraries (e.g., system libraries 534, API libraries 536, and other libraries 538), and frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with a user.

Some software architectures utilize virtual machines. In the example of FIG. 5, this is illustrated by a virtual machine 548. A virtual machine creates a software environment where applications/modules can execute as if they were executing on a hardware machine (such as the machine 600 of FIG. 6, for example). The virtual machine 548 is hosted by a host operating system (operating system 514 in FIG. 5) and typically, although not always, has a virtual machine monitor 546, which manages the operation of the virtual machine 548 as well as the interface with the host operating system (i.e., operating system 514). A software architecture executes within the virtual machine 548, such as an operating system 550, libraries 552, frameworks/middleware 554, applications 556, and/or a presentation layer 558. These layers of software architecture executing within the virtual machine 548 can be the same as corresponding layers previously described or may be different.

Example Machine Architecture and Machine-Readable Medium

Figure 6:
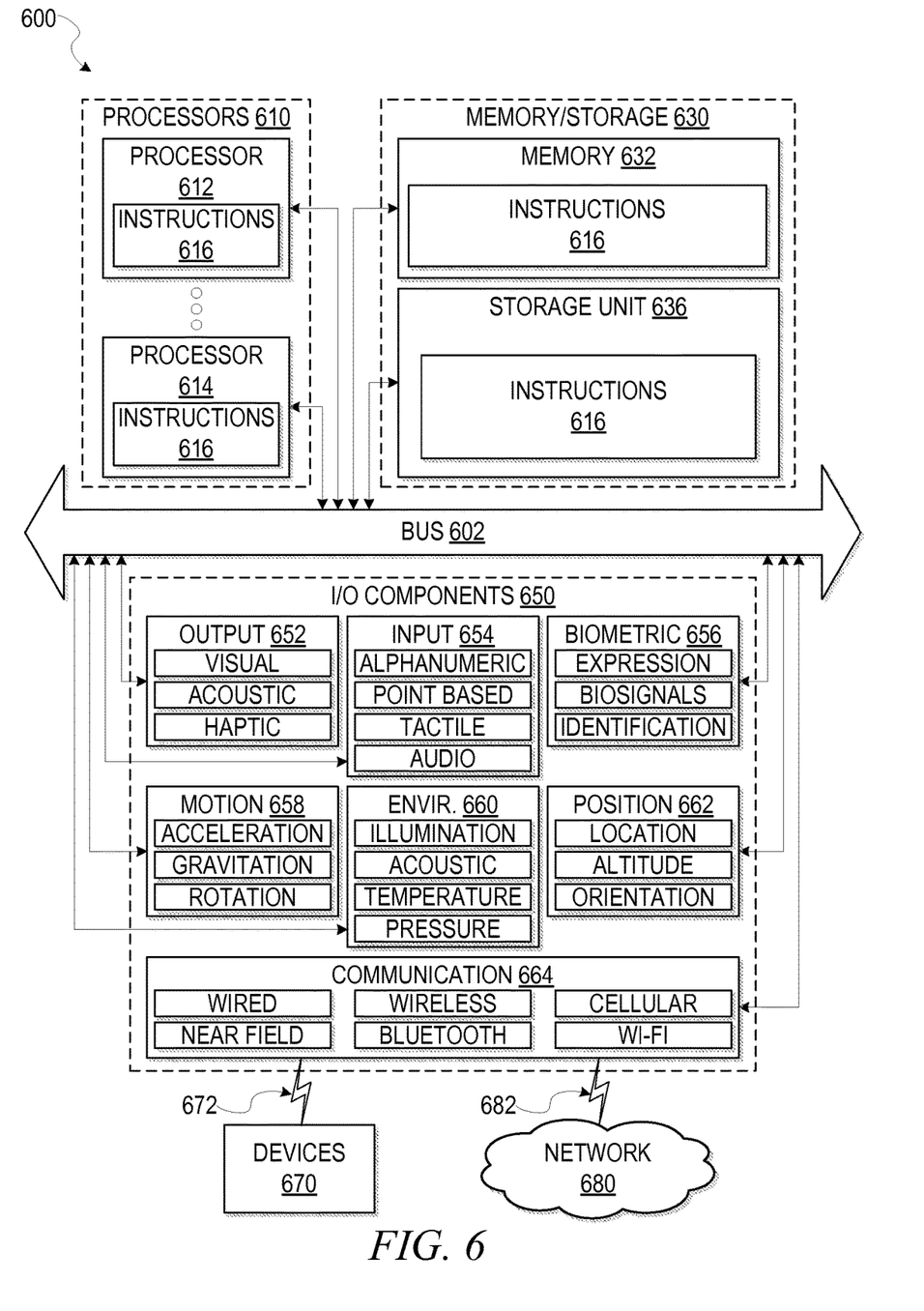
FIG. 6 is a block diagram illustrating components of a machine 600, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions 616 from a machine-readable medium (e.g., a machine-readable storage medium) and perform any one or more of the methodologies discussed herein. Specifically, FIG. 6 shows a diagrammatic representation of the machine 600 in the example form of a computer system, within which the instructions 616 (e.g., software, a program, an application, an applet, an app, or other executable code) for causing the machine 600 to perform any one or more of the methodologies discussed herein may be executed. For example, the instructions 616 may cause the machine 600 to execute the flow diagram of FIG. 4. Additionally, or alternatively, the instructions 616 may implement modules of FIGS. 1-2, and so forth. The instructions 616 transform the general, non-programmed machine 600 into a particular machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory/storage 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 612 and a processor 614 that may execute the instructions 616. The term "processor" is intended to include a multi-core processor 612, 614 that may comprise two or more independent processors 612, 614 (sometimes referred to as "cores") that may execute the instructions 616 contemporaneously. Although FIG. 6 shows multiple processors 610, the machine 600 may include a single processor 612, 614 with a single core, a single processor 612, 614 with multiple cores (e.g., a multi-core processor 612, 614), multiple processors 612, 614 with a single core, multiple processors 612, 614 with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor 612, 614's cache memory), or any suitable combination thereof, during execution thereof by the machine 600. Accordingly, the memory 632, the storage unit 636, and the memory of the processors 610 are examples of machine-readable media.

As used herein, "machine-readable medium" means a device able to store the instructions 616 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions 616, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine 600 will depend on the type of machine 600. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672 respectively. For example, the communication components 664 may include a network interface component or other suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of load balancing between a first network endpoint and a second network endpoint, the method comprising:
receiving, at the first network endpoint, a first load balancing-capable application container, the first load balancing-capable application container comprising an analysis component, a communicator component, and a user application, the user application comprising a first portion containing one or more functions executable by either the first network endpoint or the second network endpoint and a second portion containing one or more functions executable by the first network endpoint but not the second network endpoint, the second network endpoint containing a second load-balancing-capable application container;
executing the user application, causing invocation of a first function in the first portion;
in response to the invocation of the first function, obtaining one or more metrics from the first network endpoint and the second network endpoint;
calculating a first real-time aggregate score for the first function based on the one or more metrics;
determining whether to execute the first function on the first network endpoint or the second network endpoint based on a comparison of the first real-time aggregate score for the first function to a threshold and based on a second real-time aggregate score obtained from the second-load-balancing-capable application container on the second network endpoint; and
causing the first function to be executed on the network endpoint determined in the determining.

2. The method of claim 1, wherein the second load-balancing-capable application container comprises the analysis component, the communicator component, and a user application, the user application comprising the first portion and a third portion containing one or more functions executable by the second network endpoint but not the first network endpoint.

3. The method of claim 1, wherein the one or more metrics include a processing load on the first network endpoint and a processing load on the second network endpoint.

4. The method of claim 1, wherein the one or more metrics include a latency of a network connecting the first network endpoint and the second network endpoint.

5. The method of claim 1, wherein the one or more metrics include an amount of data to be sent on a network connecting the first network endpoint and the second network endpoint.

6. The method of claim 1, wherein the one or more metrics include an estimated size of a response to the first function from the second network endpoint.

7. The method of claim 1, wherein the one or more metrics include an estimated compressibility of data to be sent in response to the first function to the second network endpoint.

8. The method of claim 1, wherein the one or more metrics include an amount of data that needs to be stored in memory until a response is received to the first function.

9. A system comprising:
a first network endpoint comprising:
one or more processors;
memory; and
a first load balancing-capable application container, the first load balancing-capable application container comprising an analysis component, a communicator component, and a user application, the user application comprising a first portion containing one or more functions executable by either the first network endpoint or a second network endpoint and a second portion containing one or more functions executable by the first network endpoint but not the second network endpoint, the second network endpoint containing a second load-balancing-capable application container;
the one or more processors configured to execute the user application, causing invocation of a first function in the first portion, and configured to execute the analysis component; and
the analysis component configured to:
in response to the invocation of the first function, obtain one or more metrics from the first network endpoint and the second network endpoint;
calculate a first real-time aggregate score for the first function based on the one or more metrics;
determine whether to execute the first function on the first network endpoint or the second network endpoint based on a comparison of the first real-time aggregate score for the first function to a threshold and based on a second real-time aggregate score obtained from the second-load-balancing-capable application container on the second network endpoint; and
cause the first function to be executed on the network endpoint determined in the determining.

10. The system of claim 9, further comprising:
the second network endpoint comprising:
one or more processors;
memory; and
a second load balancing-capable application container, the second container comprising the analysis component, the communicator component, and a second user application, the second user application comprising the first portion and a third portion containing one or more functions executable by the second network endpoint but not the first network endpoint.

11. The system of claim 10, wherein the second container is written in a programming language identical to that of the first container.

12. The system of claim 9, wherein the calculating utilizes a formula assigning a weight to a score assigned to each of the one or more metrics.

13. The system of claim 12, wherein the weight for at least one of the one or more metrics is dynamically altered at run-time.

14. A non-transitory machine-readable storage medium comprising instructions, which when implemented by one or more machines, cause the one or more machines to perform operations comprising:

receiving, at the first network endpoint, a first load balancing-capable application container, the first load balancing-capable application container comprising an analysis component, a communicator component, and a user application, the user application comprising a first portion containing one or more functions executable by either the first network endpoint or the second network endpoint and a second portion containing one or more functions executable by the first network endpoint but not the second network endpoint, the second network endpoint containing a second load-balancing-capable application container;

executing the user application, causing invocation of a first function in the first portion;

in response to the invocation of the first function, obtaining one or more metrics from the first network endpoint and the second network endpoint;

calculating a first real-time aggregate score for the first function based on the one or more metrics;

determining whether to execute the first function on the first network endpoint or the second network endpoint based on a comparison of the first real-time aggregate score for the first function to a threshold and based on a second real-time aggregate score obtained from the second-load-balancing-capable application container on the second network endpoint; and causing the first function to be executed on the network endpoint determined in the determining.

15. The non-transitory machine-readable storage medium of claim 14, wherein the second load-balancing-capable application container comprises the analysis component, the communicator component, and a user application, the user application comprising the first portion and a third portion containing one or more functions executable by the second network endpoint but not the first network endpoint.

16. The non-transitory machine-readable storage medium of claim 15, wherein the calculating includes calculating, on the first network endpoint, scores based on one or more metrics measured on the first network endpoint and receiving, from the second network endpoint, scores based on one or more metrics measured on the second network endpoint that were calculated on the second network endpoint.

17. The non-transitory machine-readable storage medium of claim 14, wherein the one or more metrics include a processing load on the first network endpoint and a processing load on the second network endpoint.

18. The non-transitory machine-readable storage medium of claim 14, wherein the one or more metrics include a latency of a network connecting the first network endpoint and the second network endpoint.

19. The non-transitory machine-readable storage medium of claim 14, wherein the one or more metrics include an amount of data to be sent on a network connecting the first network endpoint and the second network endpoint.

* * * * *